Oct. 26, 1948. G. C. WICKS Re. 23,047

ELECTRIC HEATER

Original Filed March 18, 1944 3 Sheets-Sheet 1

Inventor
Geraldo Cyro Wicks

By his Attorney

ELECTRIC HEATER

Original Filed March 18, 1944 3 Sheets-Sheet 2

Inventor
Geraldo Cyro Wicks

By Clerk Munk
his Attorney

Oct. 26, 1948. G. C. WICKS Re. 23,047

ELECTRIC HEATER

Original Filed March 18, 1944 3 Sheets-Sheet 3

Inventor
Geraldo Cyro Wicks

By Otto Munk
his Attorney.

Reissued October 26, 1948

Re. 23,047

UNITED STATES PATENT OFFICE 23,047

ELECTRIC HEATER

Geraldo Cyro Wicks, New York, N. Y.

Original No. 2,400,618, dated May 21, 1946, Serial No. 527,042, March 18, 1944. Application for reissue November 20, 1947, Serial No. 788,331. In Argentina February 5, 1944

12 Claims. (Cl. 219—39)

Figure 1:
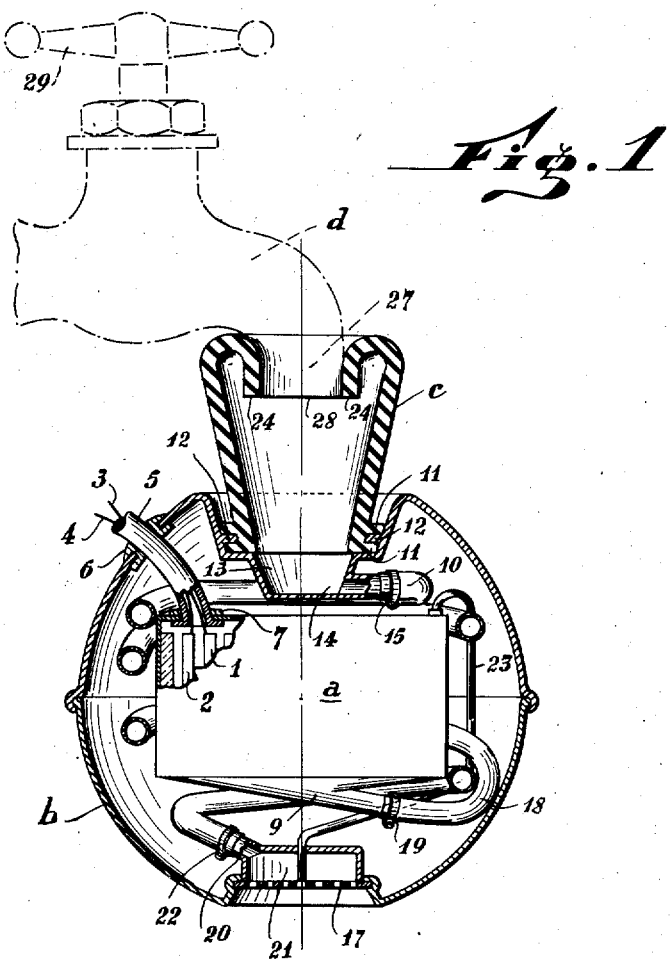

This invention relates to improvements in electric heaters and a main object of the same is to provide suitable insulating means in the devices wherein the circulating water is caused to contact with the electric circuit, of such a kind that without any complication and while maintaining a system of direct passage, said insulating means will constitute an important improvement in the practical application of the same to heating devices of any kind and in particular, to those used for heating the water for bathing and showering.

A great number of different types of electric heaters are on the market, but heretofore, the most convenient type appears to be a construction in which use is made of an insulated electric resistance, as notwithstanding the rather complex arrangement of the means for heating and circulating the water, they offer convenient conditions of safety, owing to the independence of the fluid from the electric current. As regards other types of heaters, i. e., those comprising electrodes and wherein the circulating water acts as a resistance, as well as those wherein the water is placed in contact with elements of the electric circuit, though being substantially of simple construction and use, they offer serious drawbacks in their general operation, mainly on account of unavoidable current derivations which frequently cause shocks and other objectionable effects which the corresponding authorities and distributing companies are trying to eliminate by rejecting all those devices devoid of suitable conditions of safety.

The improvements which form the object of this invention, by contemplating the particular conditions above referred to, avoid the said difficulties in a most simple manner, so as to assure beforehand their adoption in connection with the different uses concerned, and in particular as a heating device wherein the heating compartment is surrounded by a protecting jacket.

Therefore, one of the objects of this invention consists in insulating the zone of the electrodes with regard to the real inlet and outlet of the apparatus by means of an extended channel with dielectric walls, so that any current derivations of the usual distribution voltage will be practically and effectively avoided, at the point of entrance as well as of discharge.

For that purpose, the inlet end of the heater casing, on the one hand, is connected to the general inlet opening of the device by means of a tube of rubber or other suitable material which, being arranged as a coil within said casing, is of a considerable length, while on the other, the outlet of the heater casing is similarly connected to the discharge opening of the apparatus by means of a coiled rubber tube of considerable length.

By means of this arrangement, several objects of this invention are attained, the most important of which consists in that a maximum degree of insulation is assured without necessity of separating the wall of the outer casing with regard to that of the heating compartment and thus allow of the construction of devices of moderate and even small size, in comparison with the heaters of known type.

A further object is to provide a heater offering a maximum degree of safety in its operation and thus assure its general adoption by consumers and its approval by the respective authorities and distributing firms.

The invention also has for an object to perform a perfect insulation, as before stated, without undue complication in the construction of the apparatus, more so as the connection of the device is affected by simple telescoping or by a removable attachment.

Another object still is so to construct the improved heating device that the same may be placed in position ready for operation by simple telescopic coupling, without use of any supplementary means.

Other objects and advantages of this invention will appear when considering the following description of a preferred embodiment of the same, represented by way of example and to facilitate its understanding, in the accompanying illustrative drawings, wherein:

Figure 1 is a sectional view of the assembly of the improved heater, showing the arrangement of the insulating inlet and outlet ducts or coils and the coupling nozzle of the device, of a type adapted to be applied to bibcocks or similar water discharging means.

Figure 2:
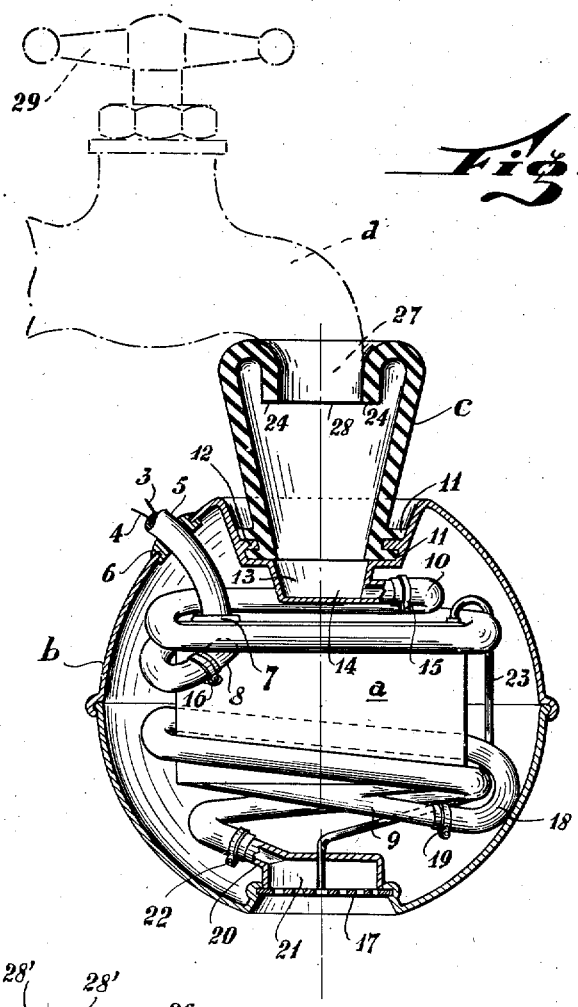
Figure 3:
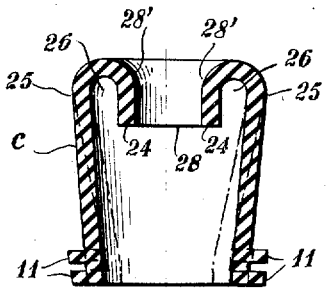

Figure 2 is an assembly view similar to that of the foregoing figure, but showing a section of the outer casing and the coupling nozzle only, so as to illustrate the arrangement of the rubber coils around the heating compartment which are entirely contained within the walls of said casing, and Figure 3 is a vertical section of the detached coupling nozzle, graphically illustrating the modification in shape allowed by its resiliency for adapting the same as a coupling means to the inlet end of the heater.

Figure 4:
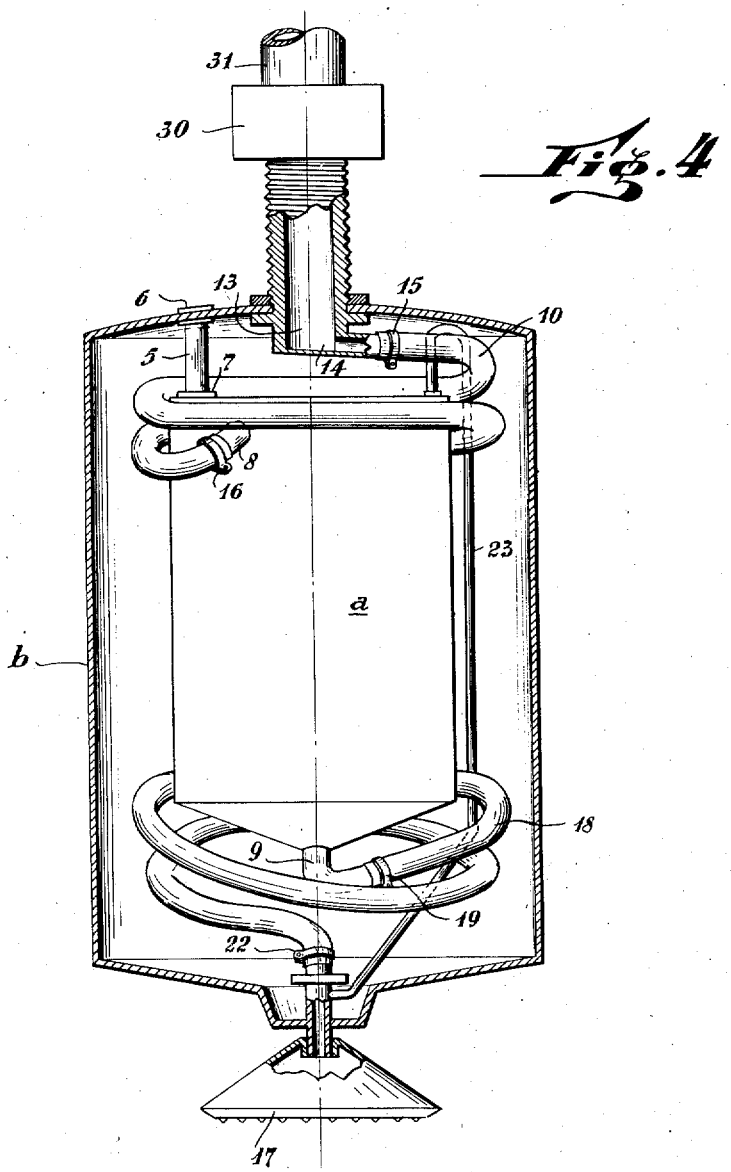

Figure 4 shows another modification of the heater, provided with the said improvements; but in this case the heater is of a type used for shower baths and no telescoping coupling nozzle is therefore required.

Similar numbers and letters of reference have been used to indicate like or corresponding parts in all the different views.

With reference to the drawings, *a* indicates the heating compartment, enclosed as usual within an outer shell or casing *b* from which it is conveniently insulated by means of dielectric supports, arranged to provide a double walled space between the said compartment and the outer casing.

The compartment *a* is provided with electrodes 1 and 2, conveniently spaced and connected to corresponding leads 3 and 4 of different polarity. The entrance of the leads 3 and 4 is suitably protected by insulating tube 5, of rubber or similar insulating material, extending first through the wall of the casing *b* by an eyelet 6 and then through the wall of the compartment *a* by means of the eyelet 7. The leads 3 and 4 are connected to the distribution line by means of a plug device or the like.

By this arrangement, the electrodes 1 and 2, being suitably spaced, will cause the water which enters by the coupling nozzle *c* and passes to the compartment *a*, to act as an ohmic resistance and become heated to the desired degree for use, as in the case of heating devices of the usual type, although, in the same way, the circuit might be closed in a metallic resistance in contact with the flowing water.

In accordance with the basic principle of this invention, the compartment *a* is provided with an inlet nozzle 8 and an outlet nozzle 9. The inlet nozzle 8 is connected in the usual manner to the coupling member *c* which forms the main inlet of the device, but instead of a direct connection, the same is established by means of a rubber coil 10. To this end, the coupling nozzle *c* which in the embodiment of Figures 1, 2 and 3 is of rubber, for its telescopic attachment to bibcocks or similar water spouts, is provided with a double flange 11, adapted for establishing a tight seal with the annular flange 12 of the pre-chamber 13, provided with a suitably bent extension 14 for its connection to one of the ends of the dielectric coil 10, the coupling being held in place by means of a collar 15.

The other end of the dielectric coil 10 is connected to the other extension or nozzle 8, being held in place by a similar collar 16, so that the water which enters by the nozzle 8, will be obliged to flow first through a duct provided by the coil 10, in order to enter into the heating compartment *a*.

The extension or nozzle 9 leads the water to the shower plate 17, but, the same as in the entrance, instead of a direct inflow, the water is caused to flow through a rubber coil 18. Said coil is connected by one of its ends to the nozzle 9 and is held in place by a collar 19, while at its other end, the coil 18 is connected to an extension or nozzle 20 of a cavity 21, forming part of the shower device 17, the coupling being secured in position by means of a collar 22. Owing to this arrangement, the water discharged from the compartment *a* will be obliged to flow through the rubber coil 18 before arriving at the final discharge outlet or shower plate 17.

The compartment *a* is electrically insulated from the outer casing or shell *b* by the inlet and outlet connections which are established through a dielectric material in the form of coils 10 and 18. Derivation of current by the flowing water is also effectively prevented because the coils 10 and 18 have been precalculated in dimensions such as an excess of length in order to eliminate any possibility of shock or derivation between the compartment *a* and the outer casing *b*, which latter, in consequence, may be constructed of metal or any other conductive material.

As the steam generated during a service should conveniently be exhausted after every use of the device and after stopping the inlet flow of the water, a tube 23, also of rubber, in order to maintain the necessary insulation, extends from the upper part of the chamber *a* downwards, in the usual way, to the shower plate 17, for exhausting the steam.

Owing to the flexibility of the tubes which form the coils 10 and 18, they will conveniently adapt themselves between the walls of the compartment *a* and the outer casing *b*, so as to strictly occupy the space usually provided between said outer shell and the heating compartment: this permits a construction of an improved heater of a small size, as will be appreciated by observing the embodiment shown in Figures 1 and 2. Such a heater by means of its coupling member *c* may directly be telescoped on a bibcock of a wash stand or lavatory. In the case of a bath heater, according to the embodiment of Figure 3, compartment *a* will be constructed of larger dimensions, so as to obtain an abundant supply of hot water.

Instead of forming a shower plate, the discharge outlet of the device may consist of a simple nozzle, provided the connection to the outlet 9 of the compartment *a* be established through a rubber coil 18.

The coupling nozzle *c* is conveniently made of rubber or other substantially resilient material and, as will be seen by referring to Figures 1, 2 and 3, said nozzle *c* is formed with an upper cup shaped part, of which the walls extend upward and form, after being bent in an inward and downward direction, an annular lip or rim 24 which extends downward to the cavity of the coupling member.

By means of the arrangement shown, the rim 24 is maintained at a certain distance from the portion 25 of the wall, so that an annular recess 26 is formed between said rim and portion of the wall, of sufficient capacity to provide for the rim 24 being expanded from its normal position shown in Figure 3, to the position shown, for instance, in Figures 1, 2 and 3, where the coupling member *c* is telescoped on the spout 27 of a bibcock *d*, whose section is substantially larger than that of the mouth 28 normally formed by the rim 24 when in its inoperative position, as indicated in Fig. 3.

Under these conditions, when the coupling nozzle *c* is telescoped in position, the lip or rim 24 is expanded and will establish an effective adjustment of sufficient adhesion for supporting the weight of the apparatus, without risk of loosening the telescopic fitting with the spout 27 of the bibcock *d*.

Besides, as the water is being discharged by the cock 29, the liquid, by its own pressure, will gravitate in all directions and tend to enlarge the section of the said cavity and thus apply a supplementary adjustment to the telescopic coupling, so as to absolutely prevent the same from slipping, to such an extent that to detach the same from the bibcock, the cock 29 must previously be closed in order to annul the pressure exerted by the liquid in the manner stated; in consequence, the adjustment itself of the heater forms a seal of a tightness superior to any fitting device.

Owing to the pronounced curvature of the walls of the coupling nozzle, as shown in Figures 1, 2 and 3, the entrance 28 is provided with a flaring part 28' which facilitates the adaption of the nozzle *c* to the bibcock 27 and assists in its ready connection and disconnection. In the embodiment shown in Figure 4, the coupling member *c* is provided with a screw coupling 30 or other suitable means, for direct connection to a water main 31.

From the foregoing description it will be seen that an insulated arrangement of the heating compartment *a* is provided in relation to the outer casing *b*, the real inlet *c* of the apparatus communicating with the inlet 8 of the compartment *a* by means of a coil 10 of rubber or other suitable dielectric material, while the outlet 9 of the compartment *a* communicates with the real outlet 17 of the apparatus by means of another coil 18, of rubber or other dielectric material, so as to oblige the water which enters by the coupling nozzle *c*, to flow through the coil 10, enter into the compartment *a*, and after becoming heated, to flow through the extension 9 of the coil 18 and be finally discharged by the shower plate 17, without any risk of the fluid being allowed to constitute a conductor for an electric discharge.

It will be evident that when carrying this invention into practice several modifications of construction and detail may be introduced into the improved heater, without departing from the basic principles of the same, as clearly set forth in the following claims.

I claim:

1. Improvements in electric heaters, of the type comprising a general outer casing, enclosing an electrically insulated heating compartment wherein the inflowing water is placed in contact with the electric circuit, characterized by that the inlet nozzle, the apparatus and the entrance of the heating compartment are in communication one with another by means of a coil of dielectric material, while the outlet of said compartment and the discharge opening or real outlet of the apparatus also communicate one with another by means of another coil of dielectric material, both coils being housed within the said outer casing of the apparatus and surrounding the heating compartment.

2. Improvements in electric heaters, of the type comprising a general outer casing, enclosing an electrically insulated heating compartment wherein the inflowing water is placed in contact with the electric circuit, in which the water inlet of the apparatus is connected to the inlet of the heating compartment by means of a coil of dielectric material, and the outlet of said heating compartment is also connected to the general discharge opening of the apparatus by means of another coil, enclosed, as the former, within the outer casing, characterized by that the inlet coil as well as the outlet coil are coiled and arranged within the space provided between the heating compartment and the outer casing and surrounding the former.

3. Improvements in electric heaters, of the type comprising a general outer casing, enclosing an electrically insulated heating compartment wherein the inflowing water is placed in contact with the electric circuit, in which the water inlet of the apparatus is connected to the inlet of the heating compartment by means of a coil of dielectric material, and the outlet of said heating compartment is also connected to the general discharge opening of the apparatus by means of another coil, enclosed, as the former, within the outer casing, characterized by that the general inlet of the apparatus is formed with a pre-compartment having an extension to which is connected one of the ends of the coil, which after a certain extension is connected at its other end to the inlet nozzle of the heating compartment, this latter being provided with an outlet nozzle to which is connected one end of another coil of dielectric material, which after a certain length is connected to a nozzle provided on a collector chamber of a shower plate or of the general outlet of the device, both said coils surrounding said heating compartment.

4. Instantaneous electric water heater comprising an electrically insulated cylindrical heating compartment, means in said compartment for establishing therein an electrical circuit for heating of water by direct contact, an outer protective casing surrounding said heating compartment at a distance from its peripheral wall and being provided in its top with an axial inlet opening and in its bottom with an axial outlet opening, a first dielectric tube coiled about the upper part of said heating compartment inside said casing and connecting said inlet opening with an inlet port provided in the upper part of said compartment, and a second dielectric tube coiled about the lower part of said compartment inside said casing and connecting an outlet port provided in the lower part of said compartment with the outlet opening of said casing.

5. Instantaneous electric water heater, as claimed in claim 4, in which said inlet port is provided in the peripheral wall of said compartment near the top thereof.

6. In an electric water heater, a fluid heating compartment, exposed electric heating elements inside the wall of said compartment, inlet and outlet paths in communication with said compartment, and forming a fluid path therewith and comprising channels of dielectric material and of preselected dimensions so that the fluid flow through said channels ohmically resists communication of effective derivative currents from the compartment and formed therein by contact between the fluid and the heating elements.

7. In an electric water heater, a fluid heating compartment, exposed electric heating elements adapted to be submerged by the fluid in said compartment, a path in communication with said compartment comprising a channel of dielectric material and of preselected dimensions so that the fluid flow through said channel ohmically resists communication of effective derivative currents from the compartment and formed therein by contact between the fluid and the heating elements.

8. In an electric water heater, a fluid heating compartment, exposed electric heating elements adapted to be submerged by the fluid in said compartment, inlet and outlet paths in communication with said compartment and forming a fluid path therewith, at least one of said paths being comprised of a channel of dielectric material and of preselected dimensions so that the fluid flow through said channel ohmically resists communication of effective derivative currents from the compartment and formed therein by contact between the fluid and the heating elements.

9. In an electric water heater a fluid heating compartment, heating means spaced within the walls of said compartment, a path in communication with said compartment comprising a channel of dielectric material and of preselected dimensions so that the fluid flow through said channel in or from the compartment has ohmic resistance to prevent communication of derivative currents in the fluid of the compartment.

10. In an electric water heater, a fluid heating compartment, exposed electrically live parts adapted to be submerged by the fluid in said compartment, inlet and outlet paths in communication with said compartment, and forming a fluid path therewith and comprising channels of dielectric material and of preselected dimensions so that the fluid flow through said channels ohmically resists communication of effective derivative currents from the compartment and formed therein by contact between the fluid and the said live parts.

11. In an electric water heater, a fluid heating compartment, exposed electrically live parts adapted to be submerged by the fluid in said compartment, a path in communication with said compartment comprising a channel of dielectric material and of preselected dimensions so that the fluid flow through said channel ohmically resists communication of effective derivative currents from the compartment and formed therein by contact between the fluid and the said live parts.

12. In an electric water heater, a fluid heating compartment, exposed electrically live parts adapted to be submerged by the fluid in said compartment, inlet and outlet paths in communication with said compartment and forming a fluid path therewith, at least one of said paths being comprised of a channel of dielectric material and of preselected dimensions so that the fluid flow through said channel ohmically resists communication of effective derivative currents from the compartment and formed therein by contact between the fluid and the said live parts.

GERALDO CYRO WICKS.

REFERENCES CITED

The following references are of record in the file of this patent:

UNITED STATES PATENTS

| Number | Name | Date |
|---|---|---|
| 1,403,594 | Duo | Jan. 17, 1922 |
| 1,916,064 | Mortensen | June 27, 1933 |
| 2,032,210 | Holt | Feb. 25, 1936 |
| 2,044,634 | Rieder | June 16, 1936 |